United States Patent [19]

Keller et al.

[11] Patent Number: 5,292,779
[45] Date of Patent: Mar. 8, 1994

[54] CARBORANE-(SILANE OR SILOXANE)-UNSATURATED HYDROCARBON BASED THERMOSETTING POLYMERS

[75] Inventors: Teddy M. Keller, Alexandria; Leslie J. Henderson, Alexandria, both of Va.

[73] Assignee: The United States of America as represented by the Secretary of the Navy, Washington, D.C.

[21] Appl. No.: 991,940

[22] Filed: Dec. 17, 1992

Related U.S. Application Data

[63] Continuation-in-part of Ser. No. 983,194, Nov. 30, 1992.

[51] Int. Cl.$^5$ .................. C08F 2/46; C08G 77/56
[52] U.S. Cl. ........................... 522/99; 522/148; 522/172; 528/5; 528/33
[58] Field of Search ............ 528/5, 33; 522/99, 148, 522/172

[56] References Cited

U.S. PATENT DOCUMENTS

| | | | |
|---|---|---|---|
| 3,234,288 | 2/1966 | D'Alello | 260/606.5 |
| 3,397,221 | 8/1968 | Papetti et al. | 260/448.2 |
| 3,457,222 | 7/1969 | Papetti et al. | 260/46.5 |
| 3,457,223 | 7/1969 | Papetti et al. | 260/46.5 |
| 3,542,730 | 11/1970 | Papetti et al. | 260/46.5 |
| 3,661,847 | 5/1972 | Chapman et al. | 260/46 SB |
| 3,733,298 | 5/1973 | Knollmueller et al. | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37.58 |
| 4,857,490 | 8/1989 | Johnson | 501/96 |
| 4,946,919 | 8/1990 | Johnson | 526/285 |

OTHER PUBLICATIONS

*Inorganic and Organometallic Polymers* M. Zeldin et al. (EDS.), Amer. Chem. Soc. Washington D.C. (1988) al-pp. 44, 90.
*Efficient "One Pot" Synthesis of Silylene-Acetylene and Disilylene-Acetylene Preceramic Polymers from Trichloroethylene.* Ijadi-Magshodi et al. J. of Polymer Science: Part A vol. 28, 955 (1990) at p. 958.
*Ceramics Via Polymer Pyrolysis,* K. J. Wynne et al. 14 Ann. Rev. Mat. Sci. 29 (1984).
*High Temperature Siloxane Elastomers,* P. Dvornic et al., Huthig & WSPF Verlag Basel, N.Y. (1990), at pp. 277, 282.
*Poly (Dodecacarborane-Siloxanes),* E. Peters, J. Macromol. Sci-Rev. Macromol. Chem., C17(2), (1979), at pp. 190–199.
*Synthesis and Study of Silylene–Diacetylene Polymers,* Magshoodi et al. 23 Macromolecules (1990) at p. 4486.
*D–Orbital Effects in Silicon Substituted $\pi$–Electron Systems. Part XII. Some Spectroscopic Properties of Alkyl and Silyl Acetylenes and Polyacetylenes,* H. Bock et al., J. Chem. Soc. (B), (1968) at p. 1159.
*Silylation as a Protective Method for Terminal Alkynes in Oxidative Couplings–A General Scheme of the Parent Polynes,* Eastmond et al.; 28 Tetrahedron 4601 (1972).
*A New Series of Organo boranes. IV. The Synthesis and Reactions of Some Silyl Neocarboranes,* Papetti et al., 3 Inorg. Chem 1448 (1964) at 1449.

(List continued on next page.)

Primary Examiner—Melvyn I. Marquis
Attorney, Agent, or Firm—Thomas E. McDonnell; Barry A. Edelberg

[57] ABSTRACT

This invention relates to a new class of novel inorganic-organic hybrid polymers that are formed from linear inorganic-organic hybrid polymers of varying molecular weight. These new high temperature oxidatively stable thermosetting polymers are formed from linear polymeric materials having repeat units that contain at least one alkynyl group for cross-linking purposes and at least one bis(silyl or siloxanyl)carboranyl group. These novel organoboron thermoset polymers contain an unsaturated cross-linked hydrocarbon moiety.

20 Claims, 2 Drawing Sheets

OTHER PUBLICATIONS

*A New Series of Organoboranes. VII the Preparation of Poly-M-Carboranylenesiloxanes*, Papetti et al., 4 J. of Polymer Sci.: Part A-1, 1623 (1966) at p. 1630.

*Icosahedral Carboranes. XV. Monomeric Carboranylenesiloxanes*, Scott et al, 9 Inorg. Chem. 2597 (1970) at p. 2599.

*Poly[ethynylene (3-n-butyl-2,5-Thiophenediyl)-ethynylene]: A Soluble Polymer Containing Diacetylene Units and Its Conversion to a Highly Cross-Linked Organic Solid*, Callstrom et al., 21 Macromolecules 3528-3530 (1988).

*Hypercross-Linked Organic Solids*: Preparation from Poly (Aromatic Diacetylenes) and Preliminary Measurements 5 of their Young's Modulus, Hardness, and Thermal Stability, Neenan et al., 21 Macromolecules 3525-3528 (1988).

FIG. 2

CARBORANE-(SILANE OR SILOXANE)-UNSATURATED HYDROCARBON BASED THERMOSETTING POLYMERS

CROSS REFERENCE TO RELATED APPLICATION

This is a continuation-in-part of prior application Ser. No. 07/983,194 filed on Nov. 30, 1992 by Keller et al. titled Carborane-(Siloxane or Silane)-Unsaturated Hydrocarbon Based Polymers and designated by Navy Case No. 74,945 which is incorporated by reference herein.

BACKGROUND OF THE INVENTION

1. Field of the Invention

This invention relates to a new class of novel inorganic-organic hybrid polymers that are formed from linear inorganic-organic hybrid polymers of varying molecular weight. These new high temperature oxidatively stable thermosetting polymers are formed from linear polymeric materials having repeat units that contain at least one alkynyl group for cross-linking purposes and at least one bis(silyl or siloxanyl)carboranyl group. These novel thermosetting polymers ca be further converted into ceramics at elevated temperatures.

2. Description of the Related Art

The cross linking of acetylenic polymers has been demonstrated by Neenan et al. in *Hypercross-Linked Organic Solids: Preparation from Poly(aromatic diacetylenes) and Preliminary Measurements of Their Young's Modulus, Hardness, and Thermal Stability* published in 21 MACROMOLECULES 3525–28 (1998), incorporated herein by reference. The reaction for cross linking acetylenic polymers illustrated by Neenan et al. is as follows:

where n is a positive integer. Other similar cross linking reactions are demonstrated by Callstrom et al. in *Poly[ethynlyene(3-n-butyl-2,5-thiophenediyl)-ethynylene]: A Soluble Polymer Containing Diacetylene Units and Its Conversion to a Highly Cross-Linked Organic Solid* published in 21 MACROMOLOCULES 3528–30 (1988), incorporated herein by reference. For example, see the reactions shown below taken from Callstrom et al.:

Scheme I

Scheme II

(3)

(4)

(5)

There is a need for oxidatively stable materials that have thermosetting properties for making rigid components therefrom, such as engine parts, turbine blades and matrices. These components must withstand high temperatures and be oxidatively stable and have sufficient strength to withstand the stress put on such components. Thus, there is a need for carborane-silane or carborane-siloxane cross-linked thermosetting polymeric materials that show high temperature stability where weight percentage loss is limited to 20% or less when heated in excess of 600° C. in an oxidative environment. In addition, there is a need for carborane-silane or carborane-siloxane cross-linked thermosetting polymeric materials that behave more as rigid materials and less as elastomeric materials.

SUMMARY OF THE INVENTION

It is therefore an object of the present invention to provide cross-linked carborane-silane-alkenyl or carborane-siloxane-alkenyl thermosetting polymers or thermosets that show less than 20% weight loss, in an oxidative environment, when heated to temperatures between 600°–1000° C.

It is another object of the present invention to provide cross-linked carborane-silane-alkenyl or carborane-siloxane-alkenyl polymers that are high temperature stable thermosetting polymers or thermosets that behave more as rigid materials and less as elastomeric materials between 25°–1000° C.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

where $n=2$, $q=q'=10$, $u=x=1$, $R^1=R^2=R^3=R^4=CH_3$, and $y \approx 11$ (MW $\approx$ 4900).

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of novel cross-linked thermosetting polymers (3) made by the following reaction:

(2)

↓ heat or light (3)

The conversion of the linear polymers (2) to the cross-linked polymers (3) is accomplished either by exposing the linear polymers (2) to heat or light. Thermal conversion of the carbon-to-carbon triple bonds in polymers (2) to form the thermosetting polymers (3) is dependent on both the curing temperature and the curing time. The heating of the linear polymers (2) is carried out over a curing time sufficient for the cross linking of the carbon-to-carbon triple bonds of the individual linear polymers (2) to occur resulting in the formation of the cross-linked polymers (3). In general, the curing time is inversely related to the curing temperature. The typical temperature range, the preferred temperature range, the more preferred temperature range and the most preferred temperature range for the thermal conversion of linear polymers (2) to the cross-linked thermoset polymers (3) are, typically, 150°–450° C., 200°–400° C., 225°–375° C. and 250°–350° C., respectively. The typical curing time, the preferred curing time, the more preferred curing time, and the most preferred curing time for the thermal conversion of linear polymers (2) to the cross-linked thermoset polymers (3) are, typically, 1–48 hours, 2–24 hours, 8–12 hours and 1–8 hours, respectively.

The photocrosslinking process, of converting the carbon-to-carbon triple bonds of the linear polymers (2) into alkenyl cross-linked functionality necessary for forming the thermosetting polymers (3), is dependent on both the exposure time and the intensity of the light used during the photocrosslinking process. Ultraviolet (UV) light is the most preferred wavelength of light used during the photocrosslinking process. The exposure time of the linear polymers (2) to the UV light is inversely related to the intensity of the UV light used. The exposure time to the Uv or to other light used is that time which is sufficient for the carbon-to-carbon triple bonds of the linear polymers (2) to be cross linked to form the thermosetting polymers (3). The intensity of the light used is that intensity which is sufficient for the carbon-to-carbon triple bonds of the linear polymers (2) to be cross linked to form the thermosetting polymers (3). Furthermore, the wavelength of the light used is not limited to the UV range. The wavelength of light used is that wavelength which is sufficient for the carbon-to-carbon triple bonds of the linear polymers (2) to be cross linked to form the thermosetting polymers (3). The typical exposure time, the preferred exposure time, the more preferred exposure time and the most preferred exposure time are, typically, 1–100 hours, 24–36 hours, 12–24 hours and 4–8 hours, respectively. Examples of the conversion of linear polymers (2) to the cross-linked thermosets (3) are given below.

The Patent Application of Keller et al. titled *Carborane-(Siloxane or Silane)-Unsaturated Hydrocarbon Based Polymers*, designated under Navy Case No.: 74,945 and filed on Nov. 30, 1992, is incorporated herein by reference. The patent application filed on Nov. 30, 1992, teaches one how to make the precursor linear polymers (2) needed for making the thermosets or thermosetting polymers (3), the subject of the present invention.

The general chemical scheme for synthesizing the linear polymers (2) is represented by the exemplary synthesis of (2') given below:

polymer produced in step 2 where n=1. By using hexachlorobutadiene in step 1, the salt of butadiyne is formed where n=2. In turn, a butadiyne moiety is incorporated into polymer (2') where n=2. In order to form a polymer where n=3, a salt of hexatriyne needs to be formed in step 1. The synthesis of the disodium salt of hexatriyne is given in the article, incorporated herein by reference, by Bock and Seidl, titled *d-Orbital Effects in Silicon Substituted π-Electron Systems. Part XII. Some Spectroscopic Properties of Alkyl and Silyl Acetylenes and Polyacetylenes*, J. CHEM. SOC. (B), 1158 (1968) at pp. 1159. Thus, by forming the appropriate alkynyl salt, the length of the alkynyl moiety, represented by the value of n, incorporated into the polymer formed in step 2 can be controlled. Typically, the value of n can be varied from 1 to 12. Acetylenic derivatives having the general formula $H(C \equiv C)_n H$ can be readily converted into the dilithio salts by reacting with n-butyllithium. The respective dilithio salts, with values where:
(1) $n=2$, $u=x=1$, and y is a postive integer;
(2) $-(C \equiv C)_n-$ represents a conjugated acetylenic moiety where $n=2$;
(3) $R^1 = R^2 = R^3 = R^4 = CH_3$;
(4)

represents said carboranyl group; and
(5) $q=q'=10$;
(6) Z is selected from the group consisting of F, Cl, Br and I;
(7) $Li-(C \equiv C)_n-Li$ represents a dilithio salt where $n=2$; and
(8) n-BuLi represents n-butyllithium.

Given the general scheme, step 1 involves forming a salt, for example, the dilithio salt of butadiyne by reacting 4 equivalents of n-BuLi with hexachlorobutadiene. To form the polymer (2'), step 2 involves reacting equal molar concentrations of the dilithiobutadiyne produced in step 1 with compound (1').

It should be noted that if trichloroethylene is used in step 1 instead of hexachlorobutadiene, a salt of ethyne or acetylene is formed in step 1 where n=1. Consequently, an ethynyl moiety is incorporated into the of n varying from 1 to 12, can then be incorporated into the backbone of polymers (2) as shown in the aforementioned step 2. The value of n can be varied, typically, from 1 to 12, more often from 1 to 10 and 1 to 8, most often from 1 to 6 and, in particular, from 1 to 3 and 1 to 2. Acetylenic derivatives having the general formula $H(C \equiv C)_n H$ can be readily formed by the synthesis given by Eastmond et al. in *Silylation as a Protective Method for Terminal Alkynes in Oxidative Couplings—A General Synthesis of the Parent Polyynes*, 28 TETRAHEDRON 4601 (1972), incorporated herein by reference.

Furthermore, a variety of compounds can be produced that have structures similar to that of compound (1') shown in step 1. One variation includes replacing the methyl groups attached to the Si with other hydrocarbon or aromatic moieties. Typical reactions synthesizing disubstituted dichloro silanes of varying size (varying values of u) and having different R groups are known in the art:

where M' is a group 1 metal or alloy. The above reaction is cited by ZELDIN ET AL. (EDITORS) in IN- ORGANIC AND ORGANOMETALLIC POLYMERS, published by American Chemical Society, Washington, D.C. (1988) at 44 and 90, incorporated herein by reference. The value of u can be varied, typically, from 1 to 1000, more often from 1 to 500 and 1 to 250, most often from 1 to 100 and 1 to 10, and, in particular, from 1 to 6. Another variation of compound (1') includes controlling the values of x in addition to that of u.

Synthesis of a variation of compound (1') where u=1 and x=0 and Z=Cl is given by Papetti et al. in *A New Series of Organoboranes. VI. The Synthesis and Reactions of Some Silyl Neocarboranes*, 3 INORG. CHEM. 1448 (1964) at 1449, incorporated herein by reference, under the caption "C,C'-Bis(methyldichlorosilyl)neocarborane (IV)." The synthesis of compound (1') where u=1 and x=1 and Z=Cl is given by Papetti et al. in *A New Series of Organoboranes. The Preparation of Poly-m-carboranylenesiloxanes*, 4 JOURNAL OF POLYMER SCIENCE: PART A-1, 1623 (1966) at 1630, incorporated herein by reference, under the caption "Compound (VII)." Synthesis of a variation of compound (1') where u=1 and x=2 and Z=Cl is given by Scott et al. in *Icosahedral Carboranes. XV. Monomeric Carboranylenesiloxanes*, 9 INORG. CHEM. 2597 (1970) at 2599, incorporated herein by reference, under the caption "1,7-Bis(5-chlorohexamethyltrisiloxanyl)-m-carborane (IV)."

While leaving u=1, the value of x can be varied, typically, from 0 to 1000, more often from 0 to 500 and 0 to 250, most often from 0 to 10, and, in particular, from 0 to 2 by the following proposed reaction scheme:

where x and w are integers greater than or equal to 0 (x≧0; w≧0) and u is a postive integer.

Following the scheme in the aforementioned steps 1 and 2, the linear polymers (2) can be formed by reacting a salt of an alkyne or a respective Grignard reagent with compound (1):

where:
(1) n is an integer from 1 to 12 and u and y are postive integers; (2) —(C≡C)$_n$— represents an unconjugated acetylenic moiety when n equals 1 or a conjugated acetylenic moiety when n is an integer greater than 1;
(3) R$^1$, R$^2$, R$^3$ and R$^4$ represent hydrocarbon moieties or halo-substituted hydrocarbon moieties.
(4)

represents said carboranyl group; and
(5) q and q' are integers from 3 to 16;
(6) Z is selected from the group consisting of F, Cl, Br and I;
(7) M—(C≡C)$_n$—M represents a salt of an alkyne or the respective Grignard reagent where M is selected from the group consisting of Li, Na, K and MgX' where X' is selected from the group consisting of F, Cl, Br and I; and
(8) x represents an integer greater than or equal to zero (x≧0).

These linear polymers (2) exhibit sufficiently low viscosities either at room temperature or at their respective melting points (mp≈200° C.) to readily fill complex dies or shapes for forming parts therefrom. In addition, these linear polymers (2) can be further polymerized into thermosets (3) and ceramics that form rigid shapes which are oxidatively stable at high temperatures above 600° C.

Two of the examples given detail the synthesis of polymer (2') and related polymer (2''), polymer (2'') having the where:
(1) u=1 and x=0, q=q'=10 and y is a positive integer.

EXAMPLES OF THE SYNTHESIS OF LINEAR POLYMERS (2)

Example 1

Synthesis of Poly(Butadiyne-1,7-Bis(Tetramethyldisiloxanyl)-Closo-Dodeca-Meta-Carborane) (2'):

Dilithiobutadiyne was prepared by the method of Ijadi-Magshoodi and Barton. See S. Ijadi-Magshoodi, Y. Pang, and T. J. Barton, *Efficient, "One-Pot" Synthesis of Silylene-Acetylene and Disilylene-Acetylene Preceramic Polymers from Trichloroethylene*, 28 J. POLYM. SCI., PART A: POLYM. CHEM. 955 (1990), incorporated herein by reference. According to Magshoodi et al., 4 equivalents of n-BuLi in THF are cooled to −78° C. and hexachlorobutadiene is slowly added. After warming to room temperature, the dilithiobutadiyne is not isolated before use. In a typical synthesis, N-BuLi (34.2 ml, 85.5 mmol) in 12.0 ml THF was cooled to −78° C. Hexachlorobutadiene (5.58 g, 21.4 mmol) in 2.0 ml THF was added dropwise by cannula. The reaction was allowed to warm to room temperature and stirred for 2 hrs. Then dilithiobutadiyne/THF was again cooled to −78° C. To this, an equal-molar amount of the 1,7-bis (chlorotetramethyldisiloxanyl)-closo-dodeca-meta-carborane (1') (10.22 g, 21.4 mmol) in 4.0 ml THF was added dropwise by cannula. The temperature of the reaction mixture was allowed to slowly rise to ambient temperature and stirred overnight. A white solid (LiCl) was filtered off and the solvent removed by evaporation at reduced pressure leaving (2').

The polymer (2') was dissolved in ether and dried over sodium sulfate. After filtration through Celite, the ether was evaporated at reduced pressure, leaving the dark-brown viscous polymer (2'). A 97% yield (9.5 g) was obtained after drying in vacuo. Gel-permeation chromatography (GPC) indicated the presence of low molecular weight species (MW~500) as well as higher average molecular weight polymers (MW~4900). Drying under vacuum at 150° C. removed lower-weight volatiles giving a 90% overall yield. Major IR peaks (cm$^{-1}$): 2963 (C-H stretch); 2600 (B-H stretch); 2175 (C≡C stretch); 1260 (Si-CH$_3$ deformation).

Example 2

Synthesis of Poly(Ethyl-1,7-Bis(Dimethylsilyl)-Closo-Dodeca-Meta-Carborane (2")

Dilithioacetylene has the formula:

Li—C≡C—Li and it is prepared by the method of Ijadi-Magshoodi et al. See S. Ijadi-Magshoodi, Y. Pang, and T. J. Barton 28 J. POLYM. SCI., PART A: POLYM. CHEM. 955 (1990), incorporated herein by reference. According to the Ijadi-Magshoodi method for preparing dilithioacetylene, 3 equivalents of n-BuLi in THF are cooled to −78° C. and trichloroethylene is slowly added. After warming to room temperature, the dilithioacetylene is not isolated before use. In a typical synthesis, n-BuLi (21.6 ml, 54.0 mmol) in 10.0 ml THF was cooled to −78° C. under an argon atmosphere.

Trichloroethylene (1.6 ml, 18.0 mmol) in 5.0 ml THF was added dropwise. The reaction was permitted to warm to room temperature and stirred for 14 hrs.

Compound (1") is synthesized according to the method of Papetti & Heying. See S. Papetti et al. 3 INORG CHEM 1448 (1964), incorporated herein by reference. The structure of compound (1") is given below:

According to the method of Papetti et al., a 100 ml round bottom 3-neck flask was fitted with an addition funnel and septa, flushed with argon, and flamed. The reaction was carried out under an inert atmosphere (argon). Butyllithium (18.0 ml/2.5M in hexanes, 44.9 mmol) was cooled to −78° C. Meta-carborane (2.5902 g, 18.0 mmol) in 10 ml THF was added dropwise. A white solid (dilithiocarborane) formed and the reaction was allowed to warm to ambient temperature. After cooling the reaction mixture back to −78° C., dichlorodimethylsilane (5.5 ml, 43.5 mmol) was added dropwise. The product (1") in solution was not isolated.

To form the product (2"), the dilithioacetylene is reacted with (1"). The dilithioacetylene in THF was cooled back to −78° C. To this, (1"), as previously prepared, was added dropwise (18.0 mmol, 5.93 g) and allowed to warm to ambient temperature and stirred overnight. The solvent was removed by evaporation at reduced pressure leaving behind the dark brown polymer (2").

EXAMPLES OF CONVERSIONS TO CROSS-LINKED THERMOSETS (3)

Example 3

Conversion of Poly[1,7-dicarbadodecborane(12)-1,7-diyl-(1,1,3,3-tetramethyl-1,3-disiloxanediyl)-butadiynediyl] (2) to Thermosetting Polymer (3).

Thermal Polymerization of 2.

2

-continued

Thermosetting Polymer 3

A 1.03 g sample of 2 a viscous liquid, was heated on a hotplate. Temperature of the hotplate was measured with a PTC ® surface thermometer (+/- 5° C.). When 2 was heated above 100° C. for 2 hr, it became thinner and runny. The linear polymer 2 was cured by heating at 150° C. for 30 min, at 198° C. for 45 min, at 250° C. for 30 min, at 320° C. for 1 hr, and at 340° C. for 1 hr. While heating at 198° C. for 45 min, 2 increased in viscosity and became very sticky as determined by touching a glass rod to the surface. Upon further heating to 250° C., 2 began to solidify, had hardened somewhat while at 320° C., and became a hard solid dark glass 3 at 340° C., During the heat treatment, 13 wt % of volatiles were evolved from the sample.

Example 4

Photocrosslinking of 2 to Produce 3

The polymer 2 was dissolved in methylene chloride. The solution was then placed on a platinum screen 1 inch square and the solvent was evaporated leaving behind a film of polymer 2 on the platinum screen. This process was repeated until a reasonable IR spectrum of 2 could be obtained using a Fourier Transform Infrared Spectrometer (FTIR). A mercury lamp with a Jarrell-Ash power supply was used without monochrometer or filters to irradiate 2 either in air or in argon. The screen was mounted on an IR cell holder so that 2 could be irradiated in the holder and both could be moved without disturbing their relative positions for monitoring by IR. Irradiation of the polymer either in air or in inert atmospheres resulted in a decrease of the intensity of the triple bond absorption (2170 $cm^{-1}$) a determined from FTIR spectroscopy. The irradiation was continued until the absorption due to the triple bond had disappeared.

Example 5

A sample of 2 (1.5490 g) was converted to 3 by quickly heating to 300° C. in argon, cured consecutively at 320°, 350°, and 400° C. for 2 hours at each temperature, and then cooled at 1° C./min. The resulting void-free dark brown solid, 3, weighed 1.4840 g (96 wt % of 2). IR ($cm^{-1}$): 2963 (C-H stretch); 2599 (B-H stretch); 1410; 1262 (Si-$CH_3$ deformation).

Example 6

Figure 2:
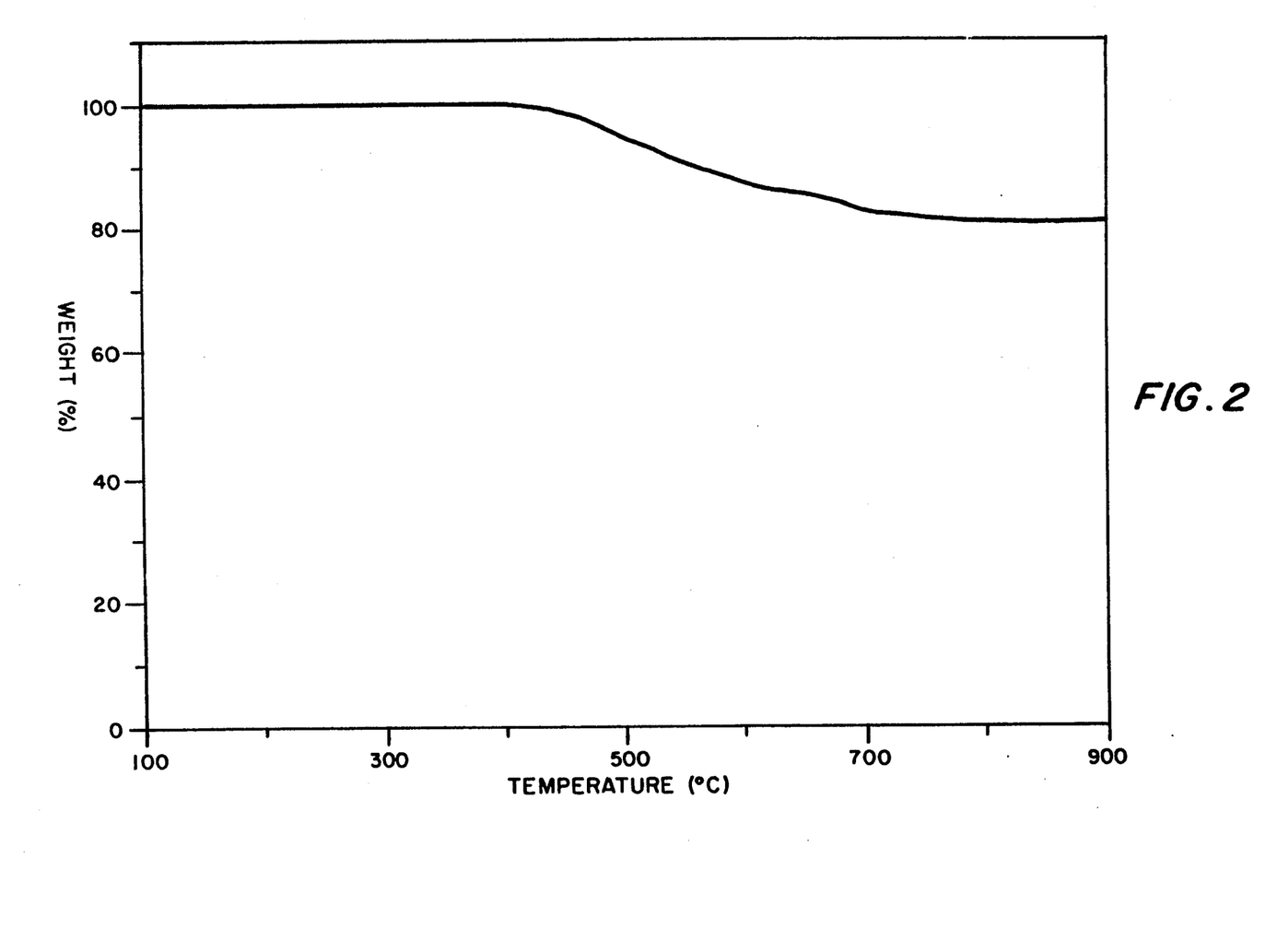
FIG. 2 is a thermogravimetric analytical (TGA) plot of weight % versus temperature in an atmosphere of nitrogen of the thermoset made from the polymer (2) poly(butadiyne-1,7-bis(tetramethyldisiloxanyl)-closo-dodeca-meta-carborane) where $n=2$, $q=q'=10$, $u=x=1$, $R^1=R^2=R^3=R^4CH_3$, and $y \approx 11$ (MW $\approx$ 4900).

FIG. 2 shows a TGA of a sample of 3 obtained by curing 2 under nitrogen consecutively for 2 hr at 250°, 300°, 325°, and 350° C. The TGA thermogram was determined on the cured sample 3 from 100 to 900° C. A single thermal degradative process is apparent starting at ≈420° C. with an 82 wt % residue retention at 900° C.

Example 7

Three samples of 2(0.5331, 0.6284, and 0.5819 g) were thermally Cross-linked to form homogeneous hard dark brown (almost black) solids 3 by heating at 300° C. for 4 hr in argon. Weight losses were 2.8, 2.6, and 3.2 wt %, respectively. The second sample was then heated in argon for 4 hr at 400° C. resulting in a loss of an additional 5.2 wt %. Visually, there was no change in the sample after the 400° C. cure.

Example 8

The third sample of EXAMPLE 7 was heated to 400° C. for 4 hr in air resulting in a weight loss of 6.4 wt %. The appearance of this sample differed from previous samples heated under inert atmospheres. The sample seemed to segregate into different components, like cement around irregularly shaped flat stone tiles, the cement having an orangish brown outline at the interfaces. Closer examination, however, reveals that what looks like stone tiles is only on the sample surface and the arteries that seemingly surround the plates are actually part of the glass-like bulk underneath the plates. Surface analysis studies indicate that the surface is enriched with oxide forms of boron and silicon.

Example 9

A solid disk of 3 (1.2263 g) was obtained by curing at a maximum temperature of 400° C. for 4 hr. The resulting sample was heated for 100 hr in a flow of air resulting in a loss of 6.8 wt %. The surface of the disk after heating was covered with yellow-brown and black flakes, some of which had fallen off. Removal of the flakes left imprints on the surface similar in shape to the flat irregular-shaped flat stone tiles described in EXAMPLE 8. However, the structural integrity of the bulk of the disk remained as a black void-free glass.

Example 10

Figure 1:
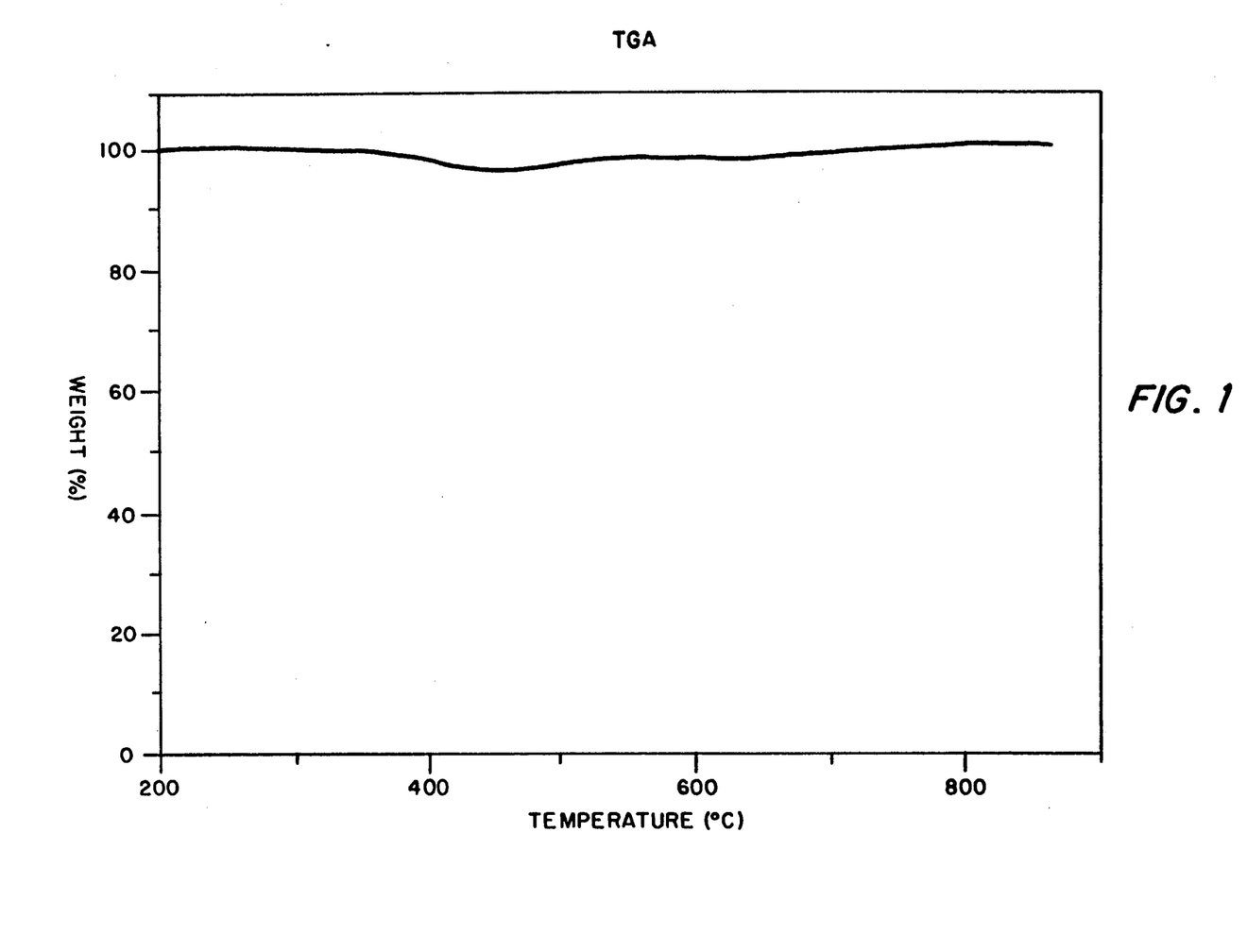
FIG. 1 is a thermogravimetric analytical (TGA) plot of weight % versus temperature in an oxidizing environment (air) of the thermoset made from the polymer (2) poly(butadiyne-1,7-bis(tetramethyldisiloxanyl)-closo-dodeca-meta-carborane) having the formula.

FIG. 1 shows a TGA in air of 3 obtained by curing 2 in air for 2 hr at 300° and at 450° C. for 3 hr. The TGA was determined on a powdery sample of 3 from 200° to 860° C. The residue at 860° C. has actually gained 1 wt %. Two thermo-oxidative degradation processes are observed each followed by periods of weight gain. We believe the gains in weight are due to the formation of oxidative protective layer, probably oxidation of boron and silicon. Weight loss first occurs from around 330° C. until 450° C. where the global minimum (96 wt %) is reached. The sample then gains weight until 550° C. (98.5 wt %) followed by a small loss up to 640° C. Weight again increases from there until 830° C. stabilizing at 101 wt %.

Example 11

Conversion of Poly[1,7-dicarbadodecborane(12)-1,7-diyl-(1,1,3,3-tetramethyl-1,3-disiloxanediyl)-ethynediyl] (2) to Thermosetting Polymer (3).

A sample (1.0) of 2 was weighed into an alumimum planchet and cured in air by heating on a hot plate at 200° C. for 1 hr and at 300° C. for 2 hr. The dark brown thermosetting polymer 3 was somewhat brittle but exhibited superb thermal and oxidative properties at elevated temperatures.

What is claimed is:

1. An organoboron thermoset polymer having a repeating unit comprising at least one carboranyl group, one or more silyl or siloxanyl groups, and at least one alkenyl crosslinked functionality.

2. The organoboron thermoset polymer of claim 1 wherein said repeating unit is represented by the formula (I):

wherein:
(1) n is an integer from 1 to 12 and u and y are positive integers;
(2)

represents alkenyl carbon atoms of an alkenyl group represented by in which the alkenyl carbon atoms are directly bonded to alkenyl carbon atoms of other alkenyl groups having the structure of other repeating units according to said formula (I);
(3) $R^1$, $R^2$, $R^3$ and $R^4$ represent hydrocarbon moieties or halo-substituted hydrocarbon moieties;
(4)

represents said carboranyl group;
(5) q and q' are integers from 3 to 16; and
(6) x represents an integer greater than or equal to zero.

3. The organoboron thermoset polymer of claim 2 wherein said carboranyl group represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

4. The organoboron thermoset polymer of claim 2 wherein said carboranyl group represents a closo-dodecacarboranyl group selected from the group consisting of closo-dodeca-ortho-carboranyl, closo-dodeca-meta-carboranyl, closo-dodeca-para-carboranyl and mixtures thereof.

5. The organoboron thermoset polymer of claim 2 wherein said $R^1$, and $R^2$, said $R^3$ and said $R^4$ represents a haloalkyl or haloaryl group having up to 20 carbon atoms or a hydrocarbon group having up to 20 carbon atoms and being selected from the group consisting of alkyl, aryl, alkylaryl and mixtures thereof.

6. The organoboron thermoset polymer of claim 2 wherein said u, and said y are integers from 1 to 1000 and said x is an integer from 0 to 1000 and said n is an integer from 1 to 12.

7. The organoboron thermoset polymer of claim 2 wherein said u, and said y are integers from 1 to 500 and said x is an integer from 0 to 500 and said n is an integer from 1 to 10.

8. The organoboron thermoset polymer of claim 2 wherein said u, and said y are integers from 1 to 250 and said x is an integer from 0 to 250 and said n is an integer from 1 to 8.

9. The organoboron thermoset polymer of claim 2 wherein said u, and said y are integers from 1 to 100 and said x is an integer from 0 to 100 and said n is an integer from 1 to 6.

10. The organoboron thermoset polymer of claim 2 wherein said n is an integer from 1 to 3 and said u is an integer from 1 to 10 and said x is an integer from 0 to 10.

11. The organoboron thermoset polymer of claim 2 wherein said n is an integer from 1 to 2 and said u is an integer from 1 to 10 and said x is an integer from 0 to 10.

12. The organoboron thermoset polymer of claim 2 wherein said n equals 1 and said u is an integer from 1 to 6 and said x is an integer from 0 to 2.

13. A method for preparing an organoboron thermoset polymer having the formula (I):

wherein:
(1) n is an integer from 1 to 12 and u and y are positive integers;
(2)

represents alkenyl carbon atoms of an alkenyl group represented by in which the alkenyl carbon atoms are directly bonded to alkenyl carbon atoms of other alkenyl groups having the structure of other repeating units according to said formula (I);

(3) $R^1$, $R^2$, $R^3$ and $R^4$ represent hydrocarbon moieties or halo-substituted hydrocarbon moieties;

(4)

represents said carboranyl group;

(5) q and q' are integers from 3 to 16; and (6) x is an integer greater than or equal to zero;

comprising the step of:

heating a carborane-siloxaneacetylenic linear polymer or a carborane-silane-acetylenic linear polymer having the formula:

wherein:

(1) n is an integer from 1 to 12 and u and y are positive integers;

(2) —(C≡C)$_n$— represents an unconjugated acetylenic moiety when n equals 1 or a conjugated acetylenic moiety when n is an integer greater than 1;

(3) $R^1$, $R^2$, $R^3$ and $R^4$ represent hydrocarbon moieties or halo-substituted hydrocarbon moieties;

(4)

represents a carboranyl group;

(5) q and q' are integers from 3 to 16; and (6) x is an integer greater than or equal to zero;

at a temperature, and for a time, sufficient for cross linking of said acetylenic moieties of said linear polymer to form said organoboron thermoset polymer according to said formula (I).

14. The process of claim 13 wherein said temperature of said heating step is from 150°–450° C. and said time is from 1–8 hours.

15. The process of claim 13 wherein said temperature of said heating step is from 200°–400° C. and said time is from 4–12 hours.

16. The process of claim 13 wherein said temperature of said heating step is from 225°–375° C. and said time is from 2–24 hours.

17. The process of claim 13 wherein said temperature of said heating step is from 250°–350° C. and said time is from 1–48 hours.

18. A method for preparing a carborane-siloxane-acetylenic polymer or a carborane-silane-acetylenic polymer having the formula (I):

wherein:

(1) n is an integer from 1 to 12 and u and y are positive integers;

(2)

represents alkenyl carbon atoms of an alkenyl group represented by in which the alkenyl carbon atoms are directly bonded to alkenyl carbon atoms of other alkenyl groups having the structure of other repeating units according to said formula (I);

(3) $R^1$, $R^2$, $R^3$ and $R^4$ represent hydrocarbon moieties or halo-substituted hydrocarbon moieties;

(4)

represents said carboranyl group;

(5) q and q' are integers from 3 to 16; and (6) x is an integer greater than or equal to zero;

comprising the step of:

exposing to light a carborane-siloxane-acetylenic linear polymer or a carborane-silane-acetylenic linear polymer having the formula:

wherein:

(1) n is an integer from 1 to 12 and u and y are positive integers;

(2) —(C≡C)$_n$— represents an unconjugated acetylenic moiety when n equals 1 or a conjugated acetylenic moiety when n is an integer greater than 1;

(3) $R^1$, $R^2$, $R^3$ and $R^4$ represent hydrocarbon moieties or halo-substituted hydrocarbon moieties;

(4)

represents a carboranyl group;

(5) q and q' are integers from 3 to 16; and (6) x is an integer greater than or equal to zero;

at a wavelength, and for a time, sufficient to cross-link said acetylenic moieties of said linear polymer thus forming said organoboron thermoset polymer according to said formula (I).

19. The process of claim 18 wherein said wavelength of said exposing step is in the ultraviolet (UV) range.

20. The process of claim 18 wherein said time of said exposing step is from 1–100 hours.

* * * * *